United States Patent
Böckenhoff et al.

(10) Patent No.: US 11,949,221 B2
(45) Date of Patent: Apr. 2, 2024

(54) POWER ELECTRONIC CIRCUIT AND METHOD FOR ITS FABRICATION

(71) Applicant: AUDI AG, Ingolstadt (DE)

(72) Inventors: Paul Böckenhoff, Hepberg (DE); Philipp Eberhart, Ingolstadt (DE); Benjamin Söhnle, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/901,622

(22) Filed: Sep. 1, 2022

(65) Prior Publication Data

US 2023/0070572 A1   Mar. 9, 2023

(30) Foreign Application Priority Data

Sep. 2, 2021 (DE) .......................... 102021122724.0

(51) Int. Cl.
| | |
|---|---|
| *H02G 5/02* | (2006.01) |
| *B60L 50/00* | (2019.01) |
| *B60R 16/02* | (2006.01) |
| *H02M 3/00* | (2006.01) |
| *H02M 7/00* | (2006.01) |

(52) U.S. Cl.
CPC .............. *H02G 5/02* (2013.01); *B60R 16/02* (2013.01)

(58) Field of Classification Search
CPC ........... H02G 5/02; H02G 5/00; H02M 3/003; H02M 7/003; B60R 16/02; B60L 50/00; B21D 7/162; B21D 22/022
See application file for complete search history.

(56) References Cited

U.S. PATENT DOCUMENTS

| | | | | |
|---|---|---|---|---|
| 3,631,698 | A * | 1/1972 | Seulen ..................... | B21D 3/00 |
| | | | | 72/707 |
| 11,139,646 | B2 * | 10/2021 | Koizumi ............... | H01B 7/0018 |
| 11,430,582 | B2 * | 8/2022 | Ito ............................ | H01B 7/08 |
| 2003/0236016 | A1 * | 12/2003 | Murakami ........... | H02G 3/0481 |
| | | | | 439/212 |
| 2008/0130223 | A1 * | 6/2008 | Nakamura ............ | H02M 7/003 |
| | | | | 361/689 |
| 2010/0026133 | A1 * | 2/2010 | Fubuki ................. | H01F 41/077 |
| | | | | 29/596 |
| 2015/0266073 | A1 * | 9/2015 | Sperrer ................. | B21D 5/004 |
| | | | | 72/342.96 |
| 2018/0315517 | A1 * | 11/2018 | Fukawa .................. | H01B 5/02 |
| 2020/0156134 | A1 * | 5/2020 | Sachdev ............... | B21D 5/008 |
| 2020/0395146 | A1 * | 12/2020 | Urushihara ............. | H01F 5/06 |

FOREIGN PATENT DOCUMENTS

| | | |
|---|---|---|
| CN | 105112829 A | 12/2015 |
| DE | 102013200428 A1 | 7/2013 |
| DE | 102019209829 A1 | 1/2021 |
| DE | 102020130857 B3 | 3/2022 |
| JP | H06297029 A | 10/1994 |

OTHER PUBLICATIONS

International Standard, "Metallic materials—Tensile testing—Part 1: Test methods at room temperature", ISO 6892-1, 2019.

* cited by examiner

*Primary Examiner* — Hoa C Nguyen
*Assistant Examiner* — Amol H Patel
(74) *Attorney, Agent, or Firm* — Seed IP Law Group LLP

(57) ABSTRACT

Current busbars may be made of copper and have at least one nominal bending point which has been locally heated and thereby softened prior to being installed. Such components may be used in power electronic circuits, especially an inverter, in fully electrical and partially electrical (hybrid) vehicles.

8 Claims, 1 Drawing Sheet

POWER ELECTRONIC CIRCUIT AND METHOD FOR ITS FABRICATION

BACKGROUND

Technical Field

Embodiments of the invention relate to current busbars made of copper and comprising power electronic circuits, especially an inverter, in fully electrical and partially electrical (hybrid) vehicles as well as a method for their fabrication.

Description of the Related Art

Embodiments of the invention relate to power electronic circuits in fully electrical and partially electrical (hybrid) vehicles and connection techniques employed during their production, especially for semiconductor power modules and intermediate circuit capacitors in the vehicle. The assemblage of the two components constitutes the so-called switching cell of an inverter. An inverter supplies power to the e-machine in the hybrid and electric vehicle.

In the current state of the art, half-bridge modules or 3-phase modules are used in so-called hard switching inverters. These are generally connected across current busbars directly to an intermediate circuit capacitor. These current busbars are joined together with a tool in two steps, so as to weld them together. In the first step, an evenly distributed joining force is applied and in the second step a cohesive connection is produced between the current busbars of the power module and the capacitor by squeezing the terminals of the power module. In the next step, this connection can be welded. Due to the uncontrolled bending of the current busbars during the joining process, stresses occur in the casting of the capacitor and on the casting compound of the power modules. These stresses in the material may lead to crack formations, which can lead to a flaking off of material and thus to direct failure of the components. Likewise, moisture can get in through the crack formation during the service life, which can likewise lead to damage and failure.

JPH 06 297 029 A discloses a wire drawing method in which a finished metal wire (product) is obtained with a desired diameter and a desired strength from a base wire with any given diameter by controlling a heating temperature at the time of the wire drawing during the drawing of the metal wire.

DE 10 2013 200 428 A1 relates to a method for forming a connection between a battery cell terminal and an interconnection busbar. A coating is arranged between a terminal substrate of the battery cell terminal and a busbar substrate of the interconnection busbar, the coating having a melting temperature which is lower than the melting temperature of the terminal substrate or the busbar substrate; and the coating is heated beyond its melting temperature in order to connect the terminal substrate and the busbar substrate.

CN 105112829 A discloses an annealing method for hard copper busbars, involving the following steps: performing a heat conservation of a hard copper busbar for 120-240 min at an annealing temperature of 340-360° C. for the annealing treatment and then quenching the hard copper busbar down to room temperature. The heat treatment improves the tensile strength of the copper.

BRIEF SUMMARY

Some embodiments provide devices and a method in which a crack formation in the casting compounds of the components is prevented.

Some embodiments include a power electronic circuit, comprising current busbars made of copper, each having at least one nominal bending point which has been locally heated and thereby softened prior to being installed.

In one embodiment, the yield strength of the copper at the at least one nominal bending point is not more than 120 MPa. In another embodiment, the yield strength of the copper at the at least one nominal bending point is not more than 70 MPa.

In some embodiments, a deliberate softening is produced in the nominal bending points of the current busbars prior to the installing of the current busbars by altering their grain texture by means of a prior localized heating. This allows for an optimized joining process with minimized stress for the current busbar geometry and the plastic casting compound (mold) of the components. Thanks to the local softening of the current busbars at the nominal bending point prior to the step of the fabrication and joining process, the bending point can be deliberately influenced or adjusted. Furthermore, the points with reduced yield strength due to their lengthwise and transverse weakening make possible a more homogeneous and significantly reduced strain on the casting compound at the intermediate circuit capacitor and at the critical points of the power modules. This is tantamount to a deliberate preventing of excessive stress and consequently failure. This softening can be done ahead of time, for example by a supplier, since the change in the material still exists after cooldown.

In one embodiment, the power electronic circuit comprising current busbars made of copper is a component of an inverter of a hybrid or electric vehicle. In another embodiment, the power electronic circuit comprising current busbars made of copper is a component of a switching cell of an inverter. In another embodiment, the power electronic circuit comprising current busbars made of copper comprises at least one semiconductor power module and at least one intermediate circuit capacitor, being connected to each other by current busbars.

Some embodiments provide a method for the fabrication of the power electronic circuit described herein. At least one nominal bending point of the current busbar is locally heated and thereby softened prior to the installing of a current busbar. The softening entails a reduction in the yield strength of the copper.

In one embodiment of the method, the current busbar is heated at the nominal bending point to at least 300° C., depending on the copper alloy used, for example to a temperature of 300° to 600° C., e.g., 300° C. to 350° C. The time needed for the heat treatment is dependent, among other things, on the furnace (temperature distribution, temperature uniformity), the number of pieces in the furnace and the batch, as well as the size or weight of the individual pieces. Basically, a relationship exists between time and temperature, i.e., the same result can be achieved with shorter time and higher temperature (used in a continuous furnace) as with longer time and lower temperature. In one embodiment of the method, the yield strength of the copper, determined by ISO 6892-1, is reduced from 180 MPa to a value in the range of 70 MPa to 120 MPa.

In one embodiment, the local heating of the nominal bending point is done by means of inductive heating. In another embodiment, the local heating of the nominal bending point is done by a furnace. In yet another embodiment, the local heating of the nominal bending point is done by contact heat transfer.

The prior softening in the nominal bending points of the current busbars enables an optimized joining process with minimized stresses for the current busbar geometry and the plastic casting compound (mold). After being installed, the current busbars are bent at predetermined positions, while the softening reduces the force required for this and the stresses occurring in the power module and capacitor are very greatly reduced. This results in a more simple and favorable production and assembly method, without the typically unwanted crack formation and delamination between current busbar and plastic casting compound.

Unlike other methods, such as the incorporating of nominal bending points by mechanical removal of copper, the method of yield strength reduction proposed here makes it possible to avoid critical stress states in the plastic casting compound (mold) and to reduce the required installation forces without reducing the effective copper cross section.

Furthermore, the local reduction of the yield strength proposed here brings definite advantages over the achieving of a reduction in yield strength by means of a laser as part of the joining process. On the one hand, this step in advance of the joining process results in less complexity for the joining process and thus a cost reduction, including on account of shorter cycle times. Moreover, a laser available for the welding of the current busbars during the joining process is only of limited use for the controlled heating required for the soft annealing on account of the high reflectivity of copper.

Further benefits and embodiments will emerge from the description and the accompanying drawings.

Of course, the above mentioned features and those yet to be explained in the following can be used not only in the particular indicated combination, but also in other combinations or standing alone, without leaving the scope of the present disclosure.

DETAILED DESCRIPTION

Figure 1:
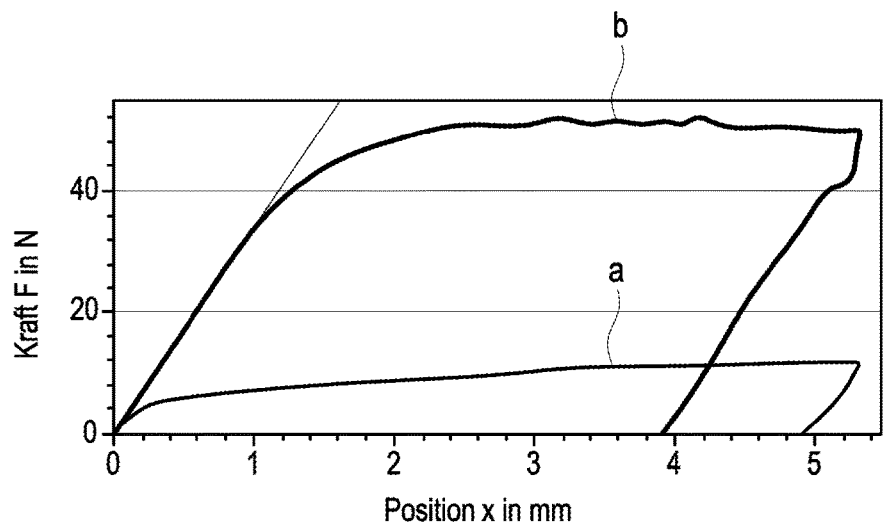
FIG. 1 shows a force/bending diagram for copper samples each bent to the same degree: (a) soft annealed and (b) rolled.

FIG. 1 shows a force/bending diagram for two copper samples each bent to the same degree: (a) soft annealed and (b) rolled. Soft annealing serves here as an extreme example for achieving a stationary, maximum softening. As can be seen from the diagram, a significantly lower force is needed for the deformation of the sample after the soft annealing. Softening of the copper generally results in a reduced yield strength.

Figure 2:
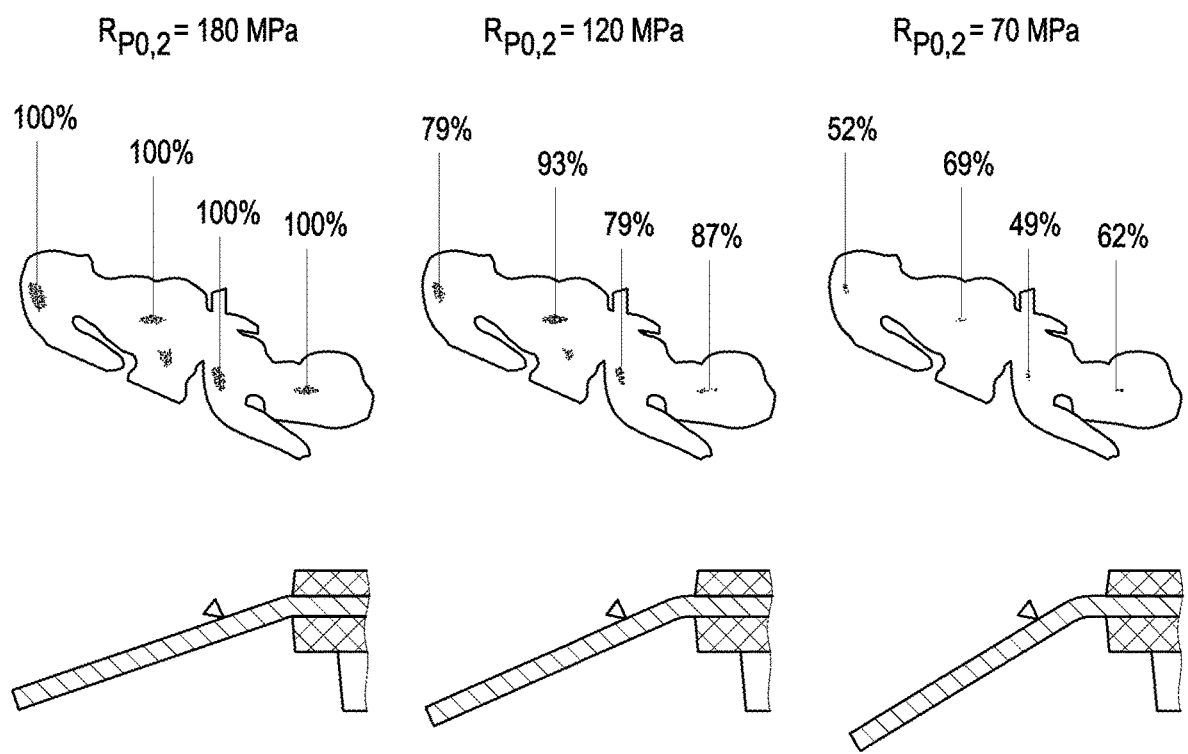
FIGS. 2a-2c show a comparison of the critically stressed points in the plastic casting compound after bending the current busbars.

FIGS. 2a-2c show a comparison of the critically stressed points in the plastic casting compound (mold) after bending the current busbars.

FIG. 2a shows the stress at the critical points when the current busbars are untreated. Each time, the stress at the critical points is set at 100%.

FIG. 2b shows the stress at the critical points when the current busbars have been subjected to a local heat treatment at the position where they are supposed to be bent. Under the assumption of a reduction in the yield strength of the copper to 120 Mpa, the stress at the critical points of the casting compound is reduced to 79% to 93%.

FIG. 2c shows the stress at the critical points when the current busbars have been subjected to a local heat treatment at the position where they are supposed to be bent, further reducing the yield strength of the copper. Under the assumption of a reduction in the yield strength of the copper to 70 Mpa, the stress at the critical points of the casting compound is reduced to 49% to 69%.

Accordingly, with the aid of the local heat treatment of the current busbars the stress in the critical points of the plastic casting compound is reduced to half of the original stress level.

German patent application no. 10 2021 122724.0, filed Sep. 2, 2021, to which this application claims priority, is hereby incorporated herein by reference, in its entirety. Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A power electronic circuit, comprising:
   current busbars made of copper, each having at least one nominal bending point which has been locally heated and thereby softened prior to being installed;
   wherein the yield strength of the copper at the at least one nominal bending point is not more than 120 MPa.

2. The power electronic circuit according to claim 1, wherein the yield strength of the copper at the at least one nominal bending point is not more than 70 MPa.

3. The power electronic circuit according to claim 1, wherein the power electronic circuit is a component of an inverter of a hybrid or electric vehicle.

4. The power electronic circuit according to claim 1, wherein the power electronic circuit is a component of a switching cell of an inverter of a hybrid or electric vehicle.

5. The power electronic circuit according to claim 1, further comprising at least one semiconductor power module and at least one intermediate circuit capacitor which are connected to each other by current busbars.

6. A method for the fabrication of a power electronic circuit including current busbars made of copper, each having at least one nominal bending point which has been locally heated and thereby softened prior to being installed, the method comprising:
   locally heating and thereby softening at least one nominal bending point of the current busbar prior to the installing of the current busbar;
   wherein the current busbar is heated to at least 300° C. at the nominal bending point.

7. A method for the fabrication of a power electronic circuit including current busbars made of copper, each having at least one nominal bending point which has been locally heated and thereby softened prior to being installed, the method comprising:
   locally heating and thereby softening at least one nominal bending point of the current busbar prior to the installing of the current busbar;
   wherein the local heating reduces the yield strength of the copper of the current busbar at the nominal bending point, determined by ISO 6892-1, from 180 MPa to a value in the range of 70 MPa to 120 MPa.

8. A method for the fabrication of a power electronic circuit including current busbars made of copper, each having at least one nominal bending point which has been locally heated and thereby softened prior to being installed, the method comprising:
  locally heating and thereby softening at least one nominal bending point of the current busbar prior to the installing of the current busbar;
  wherein the local heating of the nominal bending point is done by inductive heating.

* * * * *